US011802379B1

(12) United States Patent
Zins et al.

(10) Patent No.: US 11,802,379 B1
(45) Date of Patent: Oct. 31, 2023

(54) SELF GUARDED FROG COPPER WELD FIXTURE

(71) Applicants: Wayne A Zins, Isanti, MN (US); David M. Zins, Mora, MN (US)

(72) Inventors: Wayne A Zins, Isanti, MN (US); David M. Zins, Mora, MN (US)

( * ) Notice: Subject to any disclaimer, the term of this patent is extended or adjusted under 35 U.S.C. 154(b) by 926 days.

(21) Appl. No.: 16/795,555

(22) Filed: Feb. 19, 2020

Related U.S. Application Data (60) Provisional application No. 62/817,407, filed on Mar. 12, 2019.

(51) Int. Cl.
*E01B 31/18* (2006.01)
*B23K 9/04* (2006.01)
*E01B 7/10* (2006.01)

(52) U.S. Cl.
CPC .................. *E01B 7/10* (2013.01); *B23K 9/04* (2013.01); *E01B 31/18* (2013.01)

(58) Field of Classification Search
CPC ... E01B 31/18; E01B 7/12; E01B 7/10; B23P 6/00; B23K 2101/26; B23K 9/04
See application file for complete search history.

(56) References Cited

U.S. PATENT DOCUMENTS

| | | |
|---|---|---|
| 9,180 A | 8/1852 | Curtis |
| 52,099 A | 1/1866 | Wharton, Jr. |
| 61,243 A | 1/1867 | Parker |
| 139,271 A | 5/1873 | Skinner et al. |
| 1,391,226 A | 9/1921 | Weaver |
| 1,480,370 A | 1/1924 | Burton |
| 1,899,780 A | 12/1932 | Frickey |
| 1,933,139 A | 10/1933 | Daley |
| 1,994,479 A | 3/1935 | Lamborn |
| 2,688,180 A * | 9/1954 | Morton .................... B23K 5/18 238/148 |
| 3,192,356 A | 6/1965 | Shrubsall |
| 3,308,266 A | 3/1967 | Adams, Jr. |
| 3,755,670 A | 8/1973 | Damy |
| 3,976,239 A | 8/1976 | Finck |
| 4,229,643 A | 10/1980 | Caldwell |
| 4,429,207 A | 1/1984 | Devletian et al. |
| 4,514,235 A | 4/1985 | Augustin et al. |
| 4,686,341 A | 8/1987 | Nomura et al. |

(Continued)

OTHER PUBLICATIONS

Railroad Switch, 2019, 23 pgs, Wikipedia, https://en.wikipedia.org/w/index.php?title=Railroad_switch&printable=yes.

*Primary Examiner* — Mark T Le
(74) *Attorney, Agent, or Firm* — Albert W. Watkins (57) ABSTRACT

A self guarded frog copper weld fixture has a rail form and a pair of transverse locator arms. The rail form is configured to abut with a damaged rail frog and define a proper repaired geometry for the rail frog. A pair of locator arms transversely and vertically locate and secure the rail form against one of the rails of a damaged rail frog, by applying an opposing force against a second one of the damaged rail frog rails. Any wear will present as small gaps between the rail form and rail frog. The transverse locator arms are pivotal with respect to the rail form, and so may be rotated from transverse to the rail form to align longitudinally for compact transport or storage, and may also be reversed to allow either one of the longitudinal vertical side edges of the rail form to be abutted to the rail frog.

20 Claims, 5 Drawing Sheets

(56) References Cited

U.S. PATENT DOCUMENTS

| | | | |
|---|---|---|---|
| 4,841,116 | A | 6/1989 | Kimura et al. |
| 4,875,657 | A | 10/1989 | Moller et al. |
| 5,175,405 | A | 12/1992 | Karimine et al. |
| 5,605,283 | A | 2/1997 | Lahnsteiner et al. |
| 5,773,779 | A | 6/1998 | Morlock |
| 5,877,468 | A | 3/1999 | Morlock |
| 6,069,333 | A | 5/2000 | Morlock |
| 6,207,920 | B1 | 3/2001 | Morlock |
| 6,278,074 | B1 | 8/2001 | Morlock et al. |
| 6,396,020 | B1 | 5/2002 | Thelen et al. |
| 6,407,364 | B1 | 6/2002 | Mumaw |
| 6,944,925 | B2 | 9/2005 | Brueckert et al. |
| 7,020,977 | B2 | 4/2006 | Brueckert et al. |
| 7,038,159 | B2 | 5/2006 | Bong et al. |
| 8,367,960 | B2 | 2/2013 | Keefe |
| 8,651,393 | B2 | 2/2014 | Kral et al. |
| 10,941,527 | B2 * | 3/2021 | Koski .................... B23K 37/08 |
| 2013/0090046 | A1 * | 4/2013 | Skoblenick ............. E01B 31/17 |
| | | | 451/429 |
| 2018/0281144 | A1 * | 10/2018 | Skoblenick ............... E01B 7/00 |
| 2018/0291563 | A1 * | 10/2018 | Murphy ............... B23K 9/1735 |

* cited by examiner

SELF GUARDED FROG COPPER WELD FIXTURE

CROSS REFERENCE TO RELATED APPLICATIONS

The present application claims the benefit of U.S. provisional patent application 62/817,407 filed Mar. 12, 2019 of like title and inventorship, the teachings and entire contents which are incorporated herein by reference.

BACKGROUND OF THE INVENTION

1. Field of the Invention

This invention pertains generally to the field of railway frogs, and more particularly to a fixture that greatly facilitates repairing and restoring a railway frog.

2. Description of the Related Art

In the railroad industry, the integrity of the rails is vital to reliable operation of the trains. Literally, everything is riding on the rails. Since rail cars may be loaded with many tons of cargo, the forces between the wheel set and rails is extreme. The rails must withstand repeated application and release of these extreme forces without forming stress fractures, chipping, or the development of other defects that could cause a rail to fail. This must be achieved with continuous exposure to all weather extremes, preferably for many years.

Where the rail is a single continuous casting, and particularly with conical wheel sets, there is only minimal wear and stress placed upon the rail. The wheel cone runs across the top surface, and inherently keeps the wheel set properly aligned with the track, without the wheel flanges contacting the rail. Consequently, when properly formulated and cast, this portion of the rail can last for many years with little or no maintenance. In consideration thereof, the rails are typically cast into long lengths, for exemplary purpose 21 feet. To connect each segment, a butt weld is used to abut two adjacent cast pieces. By so interconnecting these pieces of rail, a rail of any length may then be fabricated.

As may be appreciated, there has been much technological development of butt welds, butt welding apparatus, and butt welding materials and compositions. One very old and well-known technique is the Thermit™ reaction, which is still in use today, though there have been many more compositions and apparatus developed over the many years since that offer much benefit and advantage. One such technique is butt arc welding, using forms to control and shape the weld joint. Exemplary U.S. patents, the teachings which are incorporated herein by reference, include: U.S. Pat. No. 3,308,266 by Adams Jr, entitled "Method and Apparatus for Welding of Rails"; U.S. Pat. No. 4,686,341 by Nomura et al, entitled "Gas Shield Chamber for Arc Welding of Rails"; U.S. Pat. No. 5,605,283 by Lahnsteiner et al, entitled "Weld joint between two rails arranged behind each other along a rail track"; U.S. Pat. No. 5,773,779 by Morlock, entitled "Method and system for welding railroad rails"; U.S. Pat. No. 5,877,468 by Morlock, entitled "Method and System for welding Railroad Rails"; U.S. Pat. No. 6,069,333 by Morlock, entitled "Method and System for welding Railroad Rails"; U.S. Pat. No. 6,207,920 by Morlock, entitled "Method and system for welding railroad rails"; U.S. Pat. No. 6,278,074 by Morlock et al, entitled "Method and system for welding railroad rails"; U.S. Pat. No. 6,396,020 by Thelen et al, entitled "Rail welding apparatus incorporating rail restraining device, weld containment device and weld delivery unit"; and U.S. Pat. No. 6,407,364 by Mumaw, entitled "Method and system for welding railroad rails".

Another similar technique is butt electro slag welding with shoes that can resemble forms. Exemplary U. S. patents, the teachings which are incorporated herein by reference, include: U.S. Pat. No. 3,192,356 by Shrubsall, entitled "Welding of Railroad Rails"; U.S. Pat. No. 4,229,643 by Caldwell, entitled "Consumable Welding Electrode"; U.S. Pat. No. 4,429,207 by Devletian et al, entitled "Method for Welding Railroad Rails and Means therefor"; U.S. Pat. No. 4,841,116 by Kimura et al, entitled "Process for Automatic Fusion Welding of rails"; U.S. Pat. No. 5,175,405 by Karimine et al, entitled "Method of Automatically Welding Rails"; and U.S. Pat. No. 7,038,159 by Bong et al, entitled "System and Method for Electroslag Welding an Expansion Joint Rail".

In certain locations, such as at switches or curves where there is a significant directional change, there may be much greater forces on the track. In some cases, the track itself cannot be continuous, such as in the case of a railway frog. The frog is an assembly at the crossing point of two rails, which permits the outside wheel's flange to pass through a small gap in the track. Each of the two outside, non-crossing rails is typically provided with a guard rail, which is a short piece of rail placed alongside the non-crossing rail opposite the frog. The guard rails help to ensure that the wheels follow the appropriate flangeway through the frog and that the train does not derail.

One particular type of frog, the self guarded frog, does not require guard rails. Instead, self guarded frogs have raised flanges on the frog that are typically formed during casting of the frog. These raised flanges are designed to bear on the face of the wheel as it passes through the frog.

Regardless of the type of frog, the gap required to allow the wheel flange to pass through leads to unusual stresses and forces that can accelerate wear and lead to failure much more quickly than a majority of the railway. Furthermore, in the case of the self guarded frog, the added friction generated between the raised flanges and the wheel face also generates accelerated wear.

Because derailments are both extremely hazardous and extremely expensive, maintenance of switch points, including frogs, is essential. In those locations where wear is accelerated, one approach has been to replace worn sections, such as the frog, by complete removal and replacement. An exemplary U.S. patent, the teachings which are incorporated herein by reference, is U.S. Pat. No. 3,976,239 by Finck, entitled "Process for reconditioning worn frogs".

Unfortunately, replacement requires shutting down an entire section of track until the worn component can be completely removed and replaced. Since many track sections are very busy, shutting down sections for enough time to effect removal and replacement is astronomically expensive.

To avoid extended time that a track section is out of service, some artisans have proposed bolting on removable and thereby replaceable rail components that are exposed to exceptional wear. This permits these components to be unbolted and replaced at a later date, when so required. Exemplary U.S. patents, the teachings which are incorporated herein by reference, include: U.S. Pat. No. 9,180 by Curtis, entitled "Railroad frog"; U.S. Pat. No. 52,099 by Wharton Jr., entitled "Railroad frog"; U.S. Pat. No. 61,243 by Parker, entitled "Railroad frog"; U.S. Pat. No. 139,271 by Skinner et al, entitled "Railroad frogs"; U.S. Pat. No. 1,391,226 by Weaver, entitled "Reversible frog"; U.S. Pat. No. 1,933,139 by Daley, entitled "Building up worn track members"; and U.S. Pat. No. 3,755,670 by Damy, entitled "Railroad frog assembly".

As maybe appreciated, the fasteners used must not only be tightened properly, they must also be able to withstand vibration while staying secured, and simultaneously withstand weathering sufficiently to actually be removable at some indeterminate future date. The fasteners must also have appropriate dimension so as to not interfere with the operation of the track. Since there is always a possibility that a fastener may still loosen, due for exemplary purposes to the vibrations always present in the rail and uncertainties of the installer, weather, and the like, the fastener will also most preferably not interfere even when loose. Finally, the fastener must not accelerate corrosion of the rail material, which limits the choice of material used. Unfortunately, this approach using fasteners adds complexity and can actually decrease rail reliability, and so does not effectively serve the intended purpose of reliable track and ready repair.

As an alternative to fasteners, some artisans have proposed techniques to repair the track without complete removal and replacement. In one approach illustrated in U.S. Pat. No. 4,875,657 by Moller et al, entitled "Rail repairing method and apparatus", the teachings which are incorporated herein by reference, a mold is used with poured molten metal to rebuild the track. Unfortunately and as metal foundries know well, the heating and handling of a pool of molten metal is very hazardous, including such concerns as steam explosions and accidental spills leading to burns, and the environmental and surface conditions under which the metal is applied are critical to the success of this technique. Between the hazards and technical complexity required to obtain a good repair, this approach has not been widely adopted.

In another approach illustrated in U.S. Pat. No. 8,651,393 by Kral et al, entitled "Repair insert for repairing metallic structure", the teachings which are incorporated herein by reference, the damaged track portion is ground to the shape of a pre-fabricated insert, and the insert is affixed to the track using current and pressure to resistance heat and pressure weld the insert into place. Unfortunately, it is extremely difficult with any acceptable precision to grind to the shape of the insert, and forms are of no assistance in the grinding operation. Further, the quality of the resistance heat and pressure weld is likewise extremely difficult to determine.

There are some compositions and methods that may be used either at the time of original manufacture or later for the purpose of field repair, that are intended to increase rail durability, and, where needed, to restore or rebuild worn portions of the rail. Exemplary U.S. patents, the teachings which are incorporated herein by reference, include: U.S. Pat. No. 1,480,370 by Burton, entitled "Railway-track structure"; U.S. Pat. No. 1,889,780 by Frickey, entitled "Welding process"; U.S. Pat. No. 1,933,139 by Daley, entitled "Building up worn track members"; U.S. Pat. No. 1,994,479 by Lamborn, entitled "Method of welding alloy steels"; U.S. Pat. No. 4,514,235 by Augustin et al, entitled "Frog, in particular frog point, for rail crossing or rail switches as well as process for producing same"; U.S. Pat. No. 6,944,925 by Brueckert et al, entitled "Articulated connector reconditioning process and apparatuses"; U.S. Pat. No. 7,020,977 by Brueckert et al, entitled "Method of confirming dimensions during reconditioning of an articulated connector"; and U.S. Pat. No. 8,367,960 by Keefe, entitled "Process for rail restoration and rail manufacture using welding". In particular, the most recent of these, including U.S. Pat. Nos. 6,944,925 and 7,020,977 by Brueckert et al, and U.S. Pat. No. 8,367,960 by Keefe, are very demonstrative of the present state of the art in maintaining railway frogs, which in overview summary is to add new metal to the rail using an electric arc or oxyacetylene torch, grind the newly added metal to smooth and shape the surface, measure to determine whether the repair is complete, and, if not, to again weld, grind and shape, and measure, repeating as many times as required to obtain the desired precision of geometry.

Using prior art methods and apparatus, track welders may sometimes build their own fixtures in the field using various components they have on hand, for exemplary purposes including copper blocks, clamps, tape measures and a variety of other components to create a welding form to repair the frogs. This is time consuming, inaccurate and leads to much post-welding grinding to achieve the correct shape.

As may be apparent then, and as advanced as these techniques have become, there still remains a need in the industry to provide a more rapid, reliable, and easily implemented method for repairing a railway frog. This is most preferably achieved with equipment that is: familiar to persons working in the industry; relatively portable, and with a process that can be completed quickly to minimize delays in rail traffic. This must be achieved while maintaining the quality of the repair.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a railway frog and a railway frog weld fixture. The railway frog comprises first and second raised flanges spaced apart from each other. The railway frog weld fixture comprises: a longitudinally extensive rail form having at least one longitudinally extensive and generally vertical side edge configured to abut with the railway frog first raised flange and define a proper repaired geometry for a first portion of the railway frog first raised flange; and at least one transverse locator arm having a coupling and a deployed position, the at least one transverse locator arm in deployed position coupled through the coupling with said rail form and extending transversely therefrom. The at least one transverse locator arm is configured in the deployed position to engage with and apply a first force in a first direction to the railway frog second raised flange distal to the rail form coupling while simultaneously applying a second force to the rail form in a second direction opposed to the first direction. When the at least one transverse locator arm is in the deployed position, the at least one longitudinally extensive and generally vertical side edge of the rail form abuts with and is in contact with a proper repaired geometry of the railway frog first raised flange. Wear in the first portion of the railway frog first raised flange that deviates from the proper repaired geometry is defined by a repair weld gap between the rail form and the railway frog first raised flange.

In a second manifestation, the invention is, in combination, a self guarded railway frog and a self guarded railway frog weld fixture. The self guarded railway frog comprises first and second raised flanges spaced apart from each other. The self guarded railway frog weld fixture comprises a longitudinally extensive rail form, a first transverse locator arm, a first lock, a second transverse locator arm, and a second lock. The longitudinally extensive rail form has a longitudinal axis, and a first longitudinally extensive and generally vertical side edge configured to abut with the self guarded railway frog first raised flange and define a proper repaired geometry for a first portion of the self guarded railway frog first raised flange. The rail form side edge is further configured to separate from material additively welded to the first portion of the self guarded railway frog first raised flange when the rail form is abutted thereto. The first transverse locator arm has a rail form coupling pintle about which the first transverse locator arm pivots relative to the rail form between a deployed position extending transversely from the rail form and a storage position extending longitudinally generally parallel to the rail form longitudinal axis. The first transverse locator arm is configured in the deployed position to engage with and apply a first force in a first direction to the railway frog second raised flange while simultaneously applying a second force to the rail form in a second direction opposed to the first direction. The first lock is configured to selectively lock the first transverse locator arm in at least the deployed position. The second transverse locator arm has a rail form coupling pintle about which the second transverse locator arm pivots relative to the rail form between a deployed position extending transversely from the rail form and a storage position extending longitudinally generally parallel to the rail form longitudinal axis. The second transverse locator arm rail form coupling pintle is spaced apart from the first transverse locator arm rail form coupling pintle. The second transverse locator arm is configured in the deployed position to engage with and apply a third force in a third direction to the railway frog second raised flange while simultaneously applying a fourth force to the rail form in a fourth direction opposed to the third direction. The second lock is configured to selectively lock the second transverse locator arm in at least the deployed position. The first and second transverse locator arms are each configured in the deployed position to independently span across and contact a top of the railway frog second raised flange and distal thereto a top of the railway frog first raised flange, to thereby vertically locate the longitudinally extensive rail form relative to the railway frog first raised flange. When the first and second transverse locator arms are in the deployed position, the rail form at least one longitudinally extensive and generally vertical side edge abuts with and is in contact with a proper repaired geometry of the first portion of the self guarded railway frog first raised flange. Wear in the first portion of the self guarded railway frog first raised flange that deviates from the proper repaired geometry is defined by a repair weld gap between the rail form side edge and the self guarded railway frog first raised flange.

In a third manifestation, the invention is a method of repairing a self-guarded railway frog having first and second raised flanges spaced apart from each other. According to the method, at least one locator arm is spanned from a top of the railway frog first raised flange to a top of the railway frog second raised flange. A rail form is suspended from the at least one locator arm in a location adjacent to and abutting with the railway frog first raised flange while the at least one locator arm spans from the top of the railway frog first raised flange to the top of the railway frog second raised flange. A force is applied through at least a part of the at least one spanning locator arm between and tending to spread the rail form away from the railway frog second raised flange. The rail form is pressed against the railway frog first raised flange responsive to the step of applying a force. A damaged portion of the railway frog first raised flange is defined by a gap between the rail form and the railway frog first raised flange responsive to the step of pressing the rail form against the railway frog first raised flange. A repair material is fused to the damaged portion of the railway frog first raised flange within the defining gap.

OBJECTS OF THE INVENTION

Exemplary embodiments of the present invention solve inadequacies of the prior art by providing a self guarded frog copper weld fixture comprised essentially of a rail form and at least one transverse locator arm. The rail form is preferably configured to abut with a damaged rail frog and define a proper undamaged or new geometry for the rail frog. Any wear will present as gaps between the rail form and rail frog. The at least one transverse locator arm is preferably configured to transversely and vertically locate and secure the rail form against one of the rails of a damaged rail frog, by applying an opposing force against a second one of the damaged rail frog rails.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a more rapid, reliable, and easily implemented apparatus and method for repairing a railway frog. A second object of the invention is to achieve the first objective with equipment that is: familiar to persons working in the industry; relatively light weight and portable; fully self-contained without the need for additional tools or hardware for installation; and with a process that can be completed quickly to minimize delays in rail traffic. Another object of the present invention is to achieve the first two objectives while maintaining high quality and integrity of the repair, with a minimum of clean up and finish grinding. A further object of the invention is to provide such an apparatus that is relatively compact, and yet easy to install. Yet another object of the present invention is to enable the invention to be applied in similar manner to different frog geometries.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment of the invention illustrated in FIGS. 1-5, the present invention provides a self guarded frog copper weld fixture 10 comprised essentially of a rail form 1 and at least one transverse locator arm 2. Rail form 1 is preferably configured to abut with a damaged rail frog and define a proper undamaged or new geometry for the rail frog. Any wear will present as small gaps between rail form 1 and the rail frog. Transverse locator arm 2 is preferably configured to press rail form 1 against one of the rails of a damaged rail frog, by applying an opposing force against a second one of the damaged rail frog rails.

Figure 1:
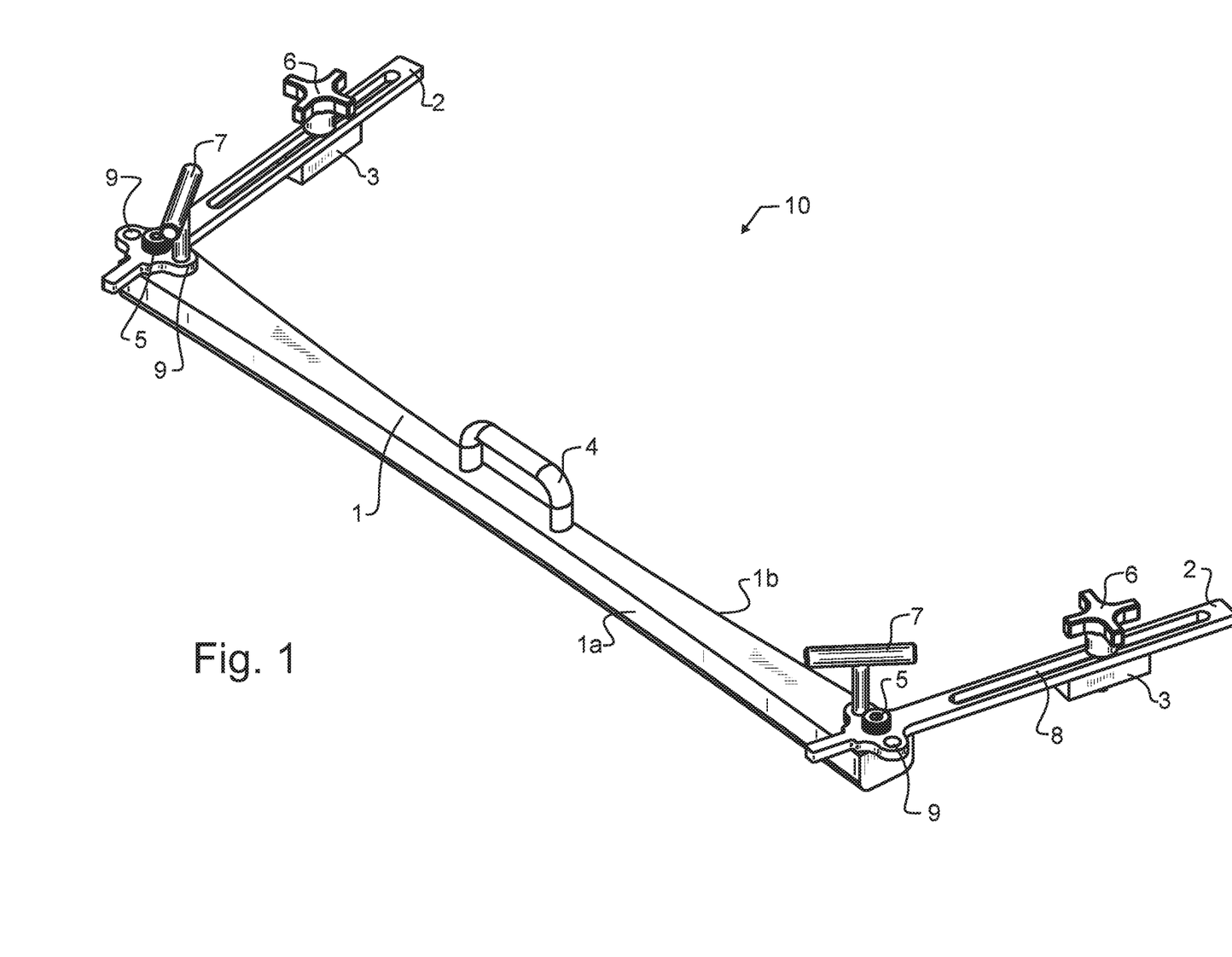
FIG. 1 illustrates a preferred embodiment self guarded frog copper weld fixture designed in accord with the teachings of the present invention from projected view.
Figure 2:
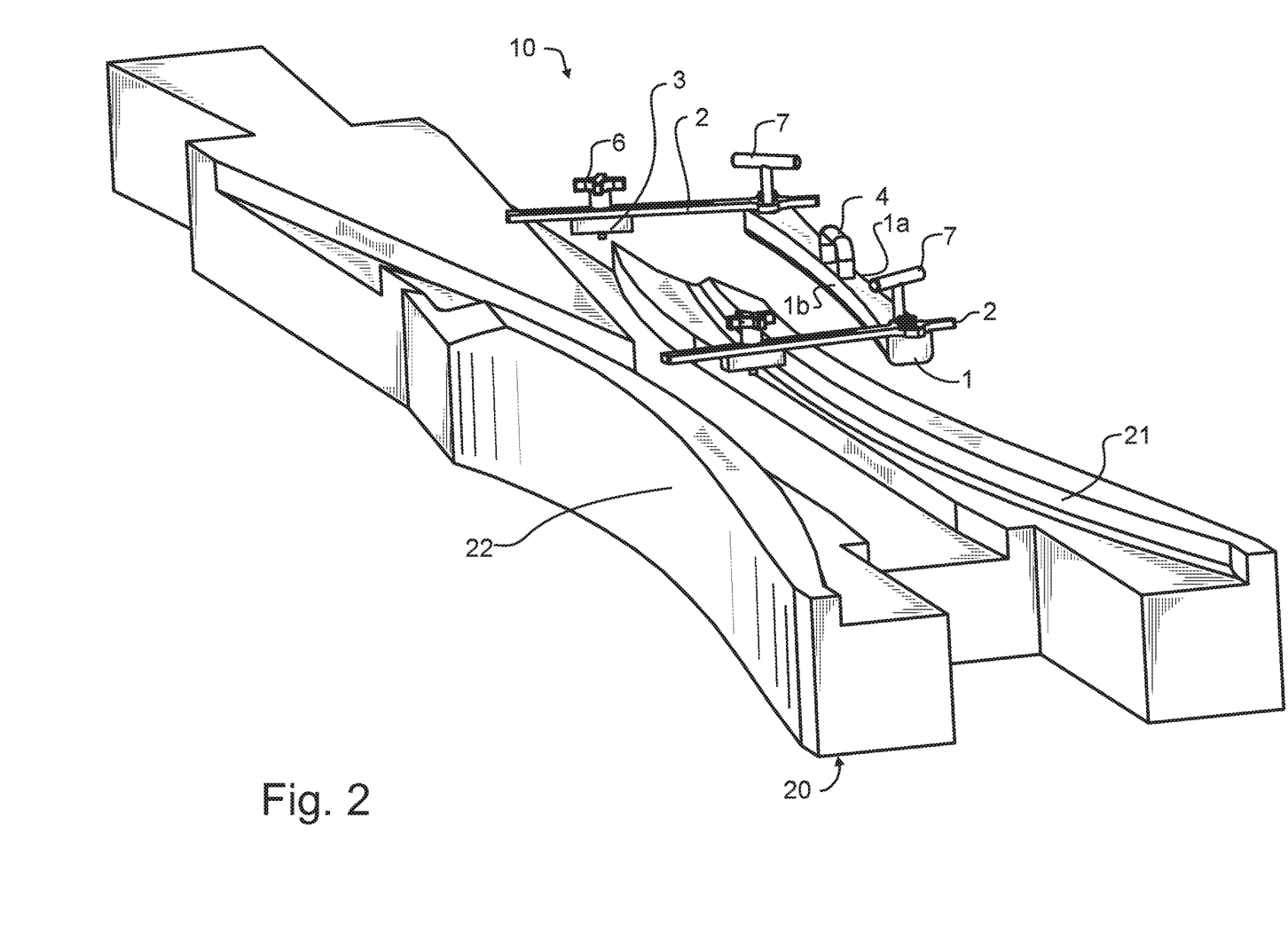
FIG. 2 illustrates the preferred embodiment self guarded frog copper weld fixture of FIG. 1 in further combination with an exemplary prior art self guarded frog from a projected view, showing the weld fixture just prior (or just subsequent) to affixing to the frog.
Figure 3:
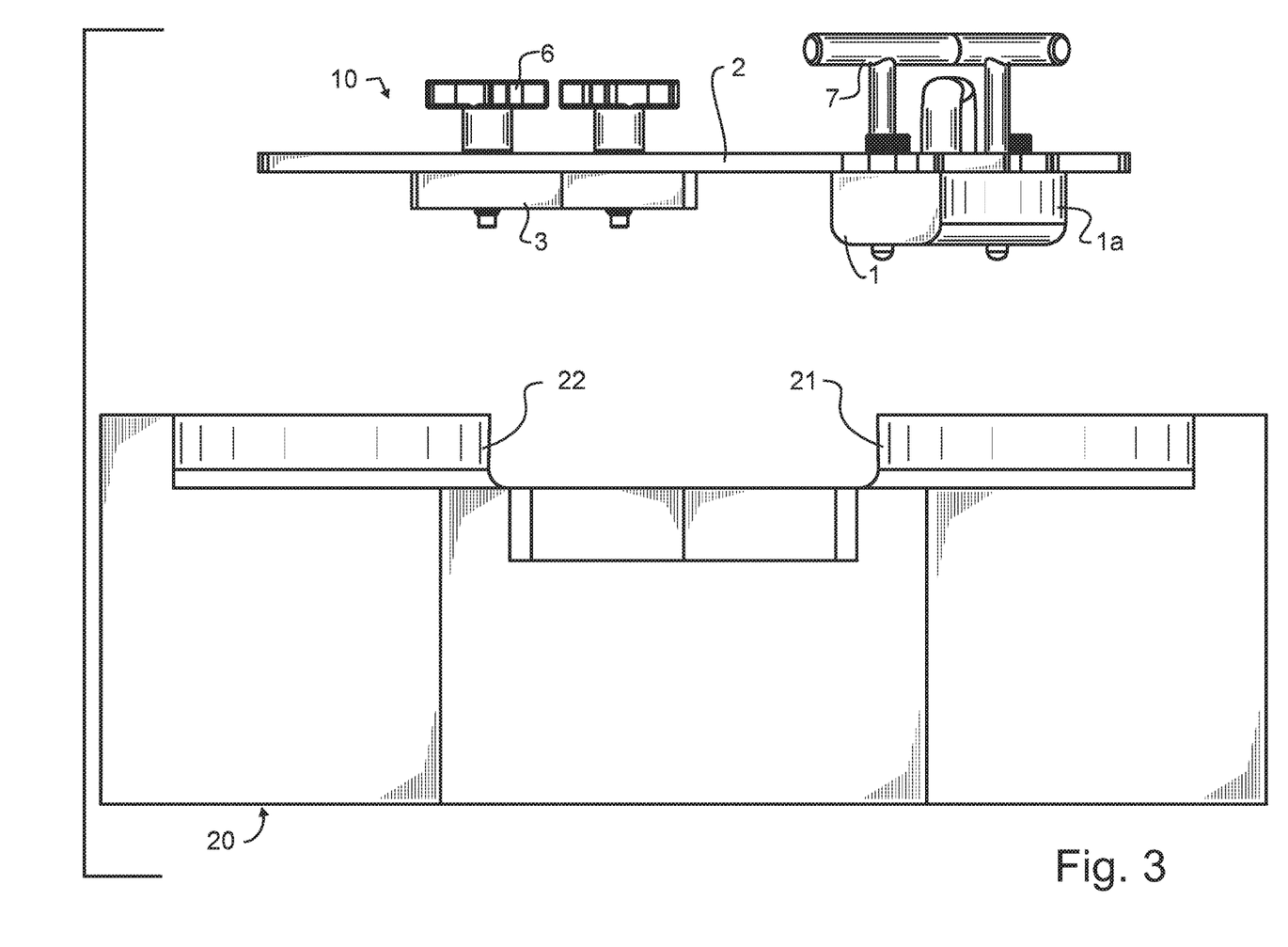
FIG. 3 illustrates the preferred embodiment combination self guarded frog copper weld fixture and self guarded frog of FIG. 2 from an end elevational view.
Figure 4:
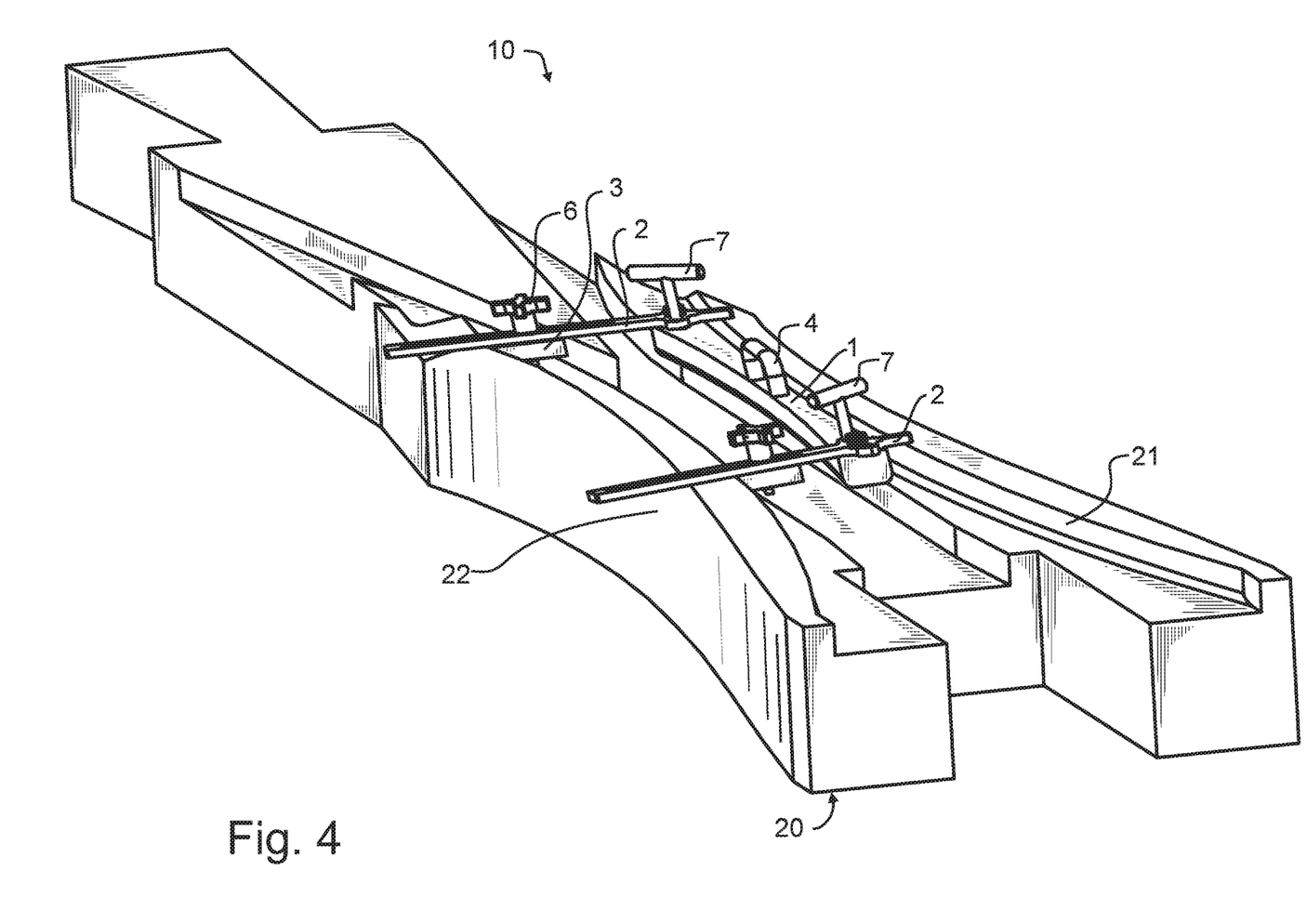
FIG. 4 illustrates the preferred embodiment combination self guarded frog copper weld fixture and self guarded frog of FIG. 2 from a projected view, but differing from FIG. 2 by illustrating the weld fixture affixed to the frog in a ready-to-use position.
Figure 5:
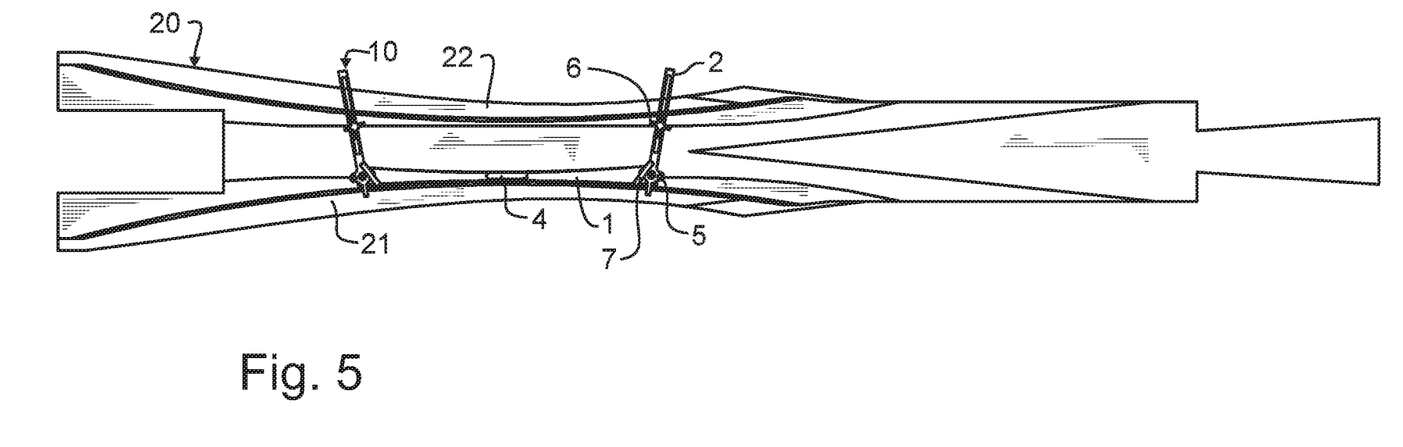
FIG. 5 illustrates the preferred embodiment combination self guarded frog copper weld fixture and self guarded frog of FIG. 4 from a top plan view.

Rail form 1 in preferred embodiment self guarded frog copper weld fixture 10 is preferably fabricated to define a length, or longitudinal axis, and on both vertical longitudinal sides 1a, 1b presents a gentle arc or radius defined about a vertical axis. As evident from the Figures, this means that rail form 1 is wider at either distal end, and narrower closer to the middle of the longitudinal axis. This geometry allows either side of rail form 1 to be pressed against a self-guarded frog 20, within and against one of the first and second raised flanges 21, 22, and to present an "as-new" geometric form that the frog would take if new and not worn from use. In FIGS. 4 and 5, rail form 1 is shown pressed against first raised flange 21. A welder may then quite simply additively weld material into rail 21 in any areas or regions that are worn away and thereby separated from rail form 1 by a gap.

The predefined geometry of rail form 1 provides the correct profile to match the rail arc radius of a new frog fixture. This allows a repairman to visually determine where repairs are needed, and to easily produce repair welds with the required shape and geometry and superior conformance to dimensional requirements, all with a minimum of clean up and finish grinding. There is no need for the prior art copper blocks, clamps, or tape measures to build a form that approximates the right shape.

Because rail form 1 is pre-machined to the proper shape, time consuming measurement and fine tuning are not needed at the time of repair to produce a weld form or to produce a weld that conforms to the needed shape. Instead, the repair welder simply locks preferred embodiment self guarded frog copper weld fixture 10 into the desired location within frog 20, and then fills in the gap between the worn surface of frog 20 and rail form 1 using any of the known procedures, such as but not limited to those disclosed in the patents incorporated by reference herein above. Because of the presence of rail form 1, the weld produced is necessarily the correct shape other than very fine finish grinding. Consequently, the process is completed without the need for measurement or repeated welding and grinding. Instead, a single welding sequence or process as known in the industry followed by finish grinding will be adequate for most repairs. This leads to much better quality repair while drastically reducing setup times, welding times, post-welding grinding and cleanup time, and welder fatigue.

Rail form 1 is preferably fabricated from copper or an alloy thereof. Copper and many alloys thereof provide excellent thermal conductivity, which maintains a cooler temperature than the rail during welding. As a result, any material that spatters or flows onto rail form 1 will tend to easily separate therefrom, particularly while the weld and rail materials cool. Consequently, after a section of self guarded frog 20 has been repaired, rail form 1 will easily separate. In the event there is any adhesion between rail form 1 and frog 20, a person may simply tap rail form 1 with a hammer, which will lead to separation. In summary, a copper rail form 1 is durable and cleans up easily after use.

While copper and alloys thereof are most preferred, many other materials are suitable as well and will be understood from the foregoing description. For exemplary and non-limiting purposes, there are a variety of refractory ceramic materials to which welding compositions known in the rail industry will not readily adhere. Among these are such compositions as titanium nitride, various other nitrides and carbides, and the like. Such compositions may be used as coatings that define an exterior contact surface, with a different and less expensive base or core in combination defining rail form 1, or used in any other suitable manner.

At least one transverse locator arm 2 is provided. As evident from the figures, in preferred embodiment self guarded frog copper weld fixture 10 two transverse locator arms 2 are preferably provided. These transverse locator arms 2 work in combination with rests 3 to transversely and vertically locate and secure preferred embodiment self guarded frog copper weld fixture 10 within self guarded frog 20, such as illustrated in FIG. 4. While parallelepiped geometries for rests 3 are preferred, which provides a relatively large substantially flat face for contact and securement with raised flanges 21, 22, in alternative embodiments other geometries for rests 3 may be used. For exemplary and non-limiting purpose, rests 3 in some alternative embodiments will be generally cylindrical. In other alternative embodiments rests 3 are provided with texture or surface geometry, or selective materials or coatings, or other features known in the mechanical and chemical arts designed to more securely engage with flanges 21, 22. Any suitable material may be used for rests 3, ranging from very hard to very soft, and elastomeric or rigid.

Where only one transverse locator arm 2 is provided, the arm 2 will couple to rail form 1 at a location displaced from either distal end, and therefore between the two distal ends of rail form 1. This placement will help to ensure that a single locator arm will apply forces that will tend to hold rail form 1 abutted against the appropriate rail flange, and not twist away therefrom on either end. As may be apparent or now appreciated, in preferred embodiment self guarded frog copper weld fixture 10 two or more transverse locator arms 2 are preferred, since two distally located arms will ensure that the entire length of rail form 1 is secured against the adjacent one of flanges 21, 22.

Transverse locator arms 2 most preferably extend beyond rail form 1 at one end of the arm and beyond generally cylindrical rest 3 at the distal end of arm 2. By providing at least two spaced apart transverse locator arms 2, this also ensures that the top of preferred embodiment self guarded frog copper weld fixture 10 is also aligned vertically with frog 20 by resting arms 2 against the top surface of frog 20.

In the operative position of FIGS. 4 and 5, rail form 1 is pressed against first raised flange 21, running immediately adjacent thereto and generally defining a longitudinal axis. Transverse locator arms 2 span across the top surface of frog 20, in a direction generally transverse to the longitudinal axis of rail form 1, and define the vertical position of rail form 1 relative to frog 20. Rests 3 are pressing against first raised flange 22, and in combination with transverse locator arms 2 keep rail form 1 secured against first raised flange 21 in all three axes. Threaded knob 6 preferably engages a threaded rod or fastener extending along a vertical axis from the associated rest 3.

A slot 8 is provided in transverse locator arm 2, the slot extending generally parallel to the longitudinal axis of arm 2. This slot 2 and threaded knob 6 enable a person to tighten knob 6 and thereby draw both knob 6 and rest 3 into firm and secure engagement with arm 2. In this manner, preferred embodiment self guarded frog copper weld fixture 10 maybe adjusted to fit securely within frogs that have different rail spacings, or that otherwise vary in dimension from an ideal measurement. As may be apparent, this enables a person to very quickly and easily set up preferred embodiment self guarded frog copper weld fixture 10, and then get right to the repair weld. As noted herein above, down time can be astronomically expensive, particularly on busy switches, and so all time savings are of tremendous benefit. While knob 6 and rest 3 are most preferred, those skilled in the mechanical arts with a reading of the present disclosure will recognize many alternatives that are used in alternative embodiments.

Handle 4 is optional, but provides a convenient and secure way to hold preferred embodiment self guarded frog copper weld fixture 10 while securing it to frog 20. In addition, when repairs to the adjacent one of the flanges 21, 22 are complete, handle 4 also provides a good point to apply force to separate rail form 1 from frog 20, while both staying cool and distributing the force, thereby reducing risk of damage to either of rail form 1 or the welder.

Once raised flange 21 is repaired using preferred embodiment self guarded frog copper weld fixture 10 and self guarded frog 20 as illustrated in the Figures, rail form 1 may then be repositioned by rotation of preferred embodiment self guarded frog copper weld fixture 10 through 180 degrees about a vertical axis, and then used again to thereby serve as a welding form to repair second raised flange 22.

As already noted herein above, in preferred embodiment self guarded frog copper weld fixture 10, the two vertical longitudinal edge surfaces 1a, 1b present a gentle arc or radius defined about a vertical axis. However, and also in preferred embodiment self guarded frog copper weld fixture 10, these two vertical longitudinal edge surfaces 1a, 1b are provided with slightly different radiuses. This allows a single rail form 1 to be used to repair different portions of the frogs of two different curvatures. In other words, and for exemplary and non-limiting purpose only, vertical longitudinal edge surface 1a will be used as the form to repair a short rail section of a prior art self guarded frog 20, while vertical longitudinal edge surface 1b will be used as the form to repair a different throat section of prior art frog 20 having a slightly different arc radius.

Socket head shoulder screw 5 defines a pintle about which transverse locator arm 2 can rotate. To accomplish this, the shoulder of socket head shoulder screw 5, which is the unthreaded portion adjacent to the socket head, should correspond in length to just more than the thickness of transverse locator arm 2. Then socket head shoulder screw 5 may be tightened securely into rail form 1, and retain but allow transverse locator arm 2 to pivot around the shoulder. As may be appreciated, in alternative embodiments there are many other pintles and bearings known in the mechanical arts that are used as substitutes for socket head shoulder screw 5.

As described herein above, both sides of rail form 1 are preferably shaped in a concave manner to correspond to the opposing sides of frog 20. In one alternative embodiment, only one side of rail form 1 is concave shaped. In this alternative embodiment, the entire preferred embodiment self guarded frog copper weld fixture 10 will be lifted and rotated about a vertical axis through 180 degrees, and then dropped back into engagement with self guarded frog 20. This will allow both raised flanges 21, 22 to be repaired.

In accord with another alternative embodiment and method, the repair welder may reverse preferred embodiment self guarded frog copper weld fixture 10 from providing a weld fixture for first raised flange 21 to providing a weld fixture for second raised flange 22 by releasing each T-handle 7 by lifting it up and away from rail form 1, and then pivoting the handle and associated transverse locator arm 2 through a 180 degree rotation about the vertical axis defined by the longitudinal axis of the T-handle. Finally, T-handle 7 will be re-inserted into the same insertion point in rail form 1, by passing through the selector hole 9 that is located opposite of socket head shoulder screw 5 from the T-handle. The method and apparatus for coupling T-handle 7 to rail form 1 is not critical to the present invention, and may for exemplary purposes in various embodiments include one or more of threading provided within a hole in rail form 1 that mates with threading provided on the tip of T-handle 7, threading within the interior of selector hole 9 that mates with threading provided on the tip of T-handle 7, or one of the many other known equivalents in the mechanical arts. While this re-arrangement of transverse locator arms 2 is not necessary, since the entire preferred embodiment self guarded frog copper weld fixture 10 may be rotated, the preferred provision of T-handles 7 and selector holes 9 allows transverse locator arms 2 to rotate from one side to the other with no tools required. Where both vertical longitudinal sides 1a, 1b are provided with the same arc, this allows the repair person to alternate use of rail form 1a, 1b vertical faces easily, which will therefore share and distribute the wear and tear between the two vertical faces, thereby roughly doubling the life of rail form 1 without incurring major additional expense.

By permitting T-handles 7 to lift, irrespective of whether the curvature of the two vertical longitudinal sides 1a, 1b is identical or different, also permits transverse locator arms 2 to fold in to a position parallel to the longitudinal axis of rail form 1, allowing preferred embodiment self guarded frog copper weld fixture 10 to be more easily ported about, and also to be more easily stored in a much smaller space. Further, preferred embodiment self guarded frog copper weld fixture 10 is a self-contained unit, which does not require tools or other associated hardware to install and use. Finally, since all components of preferred embodiment self guarded frog copper weld fixture 10 other than rail form 1 can be universal, only rail form 1 needs to be machined to fit a particular self guarded frog 20.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. In combination, a railway frog and a railway frog weld fixture,
   said railway frog comprising
     first and second raised flanges spaced apart from each other,
   said railway frog weld fixture comprising:
     a longitudinally extensive rail form having at least one longitudinally extensive and generally vertical side edge configured to abut with said railway frog first raised flange and define a proper repaired geometry for a first portion of said railway frog first raised flange; and at least one transverse locator arm having a coupling and a deployed position, said at least one transverse locator arm in said deployed position coupled through said coupling with said rail form and extending transversely therefrom;

said at least one transverse locator arm configured in said deployed position to engage with and apply a first force in a first direction to said railway frog second raised flange while simultaneously applying a second force to said rail form in a second direction opposed to said first direction;

wherein when said at least one transverse locator arm is said deployed position, said at least one longitudinally extensive and generally vertical side edge of said rail form abuts with and is in contact with a proper repaired geometry of said railway frog first raised flange, and wear in said first portion of said railway frog first raised flange that deviates from said proper repaired geometry is defined by a repair weld gap between said rail form and said railway frog first raised flange.

2. The combination railway frog and railway frog weld fixture of claim 1, wherein said at least one longitudinally extensive and generally vertical side of said rail form edge comprises a first longitudinally extensive and generally vertical side edge and a second longitudinally extensive and generally vertical side edge.

3. The combination railway frog and railway frog weld fixture of claim 2, wherein said first longitudinally extensive and generally vertical side edge comprises a first geometry configured to correspond to said proper repaired geometry of said first portion of said railway frog first raised flange.

4. The combination railway frog and railway frog weld fixture of claim 3, wherein said second longitudinally extensive and generally vertical side edge comprises said first geometry configured to correspond to said proper repaired geometry of said first portion of said railway frog first raised flange.

5. The combination railway frog and railway frog weld fixture of claim 3, wherein said second longitudinally extensive and generally vertical side edge comprises a second geometry different in geometry from said first portion of said railway frog first raised flange.

6. The combination railway frog and railway frog weld fixture of claim 5, wherein said second geometry is configured to correspond to a proper repaired geometry of a second portion of said railway frog first raised flange.

7. The combination railway frog and railway frog weld fixture of claim 1, wherein said at least one transverse locator arm comprises:

a first transverse locator arm having a rail form coupling and a deployed position, said first transverse locator arm in said deployed position coupled through said rail form coupling with said rail form and extending transversely therefrom;

said first transverse locator arm configured in said deployed position to engage with and apply a first force in a first direction to said railway frog second raised flange while simultaneously applying a second force to said rail form in a second direction opposed to said first direction; and a second transverse locator arm having a rail form coupling and a deployed position, said second transverse locator arm in said deployed position coupled through said rail form coupling with said rail form and extending transversely therefrom;

said second transverse locator arm configured in said deployed position to engage with and apply a third force in a third direction to said railway frog second raised flange while simultaneously applying a fourth force to said rail form in a fourth direction opposed to said third direction.

8. The combination railway frog and railway frog weld fixture of claim 1, wherein said at least one transverse locator arm coupling further comprises a pintle about which said at least one transverse locator arm pivots relative to said rail form.

9. The combination railway frog and railway frog weld fixture of claim 8, further comprising a locking handle configured to selectively lock said at least one transverse locator arm in at least one fixed position relative to said rail form.

10. The combination railway frog and railway frog weld fixture of claim 9, wherein said locking handle is configured to selectively prevent rotation of said at least one transverse locator arm when said at least one transverse locator arm is in said deployed position relative to said rail form, and is configured to selectively prevent rotation of said at least one transverse locator arm when said at least one transverse locator arm is in a storage position extending longitudinally generally parallel to said rail form longitudinal axis.

11. The combination railway frog and railway frog weld fixture of claim 1, wherein said railway frog further comprises a self guarded rail frog.

12. The combination railway frog and railway frog weld fixture of claim 1, wherein said at least one transverse locator arm in said deployed position engages with a top of said railway frog second raised flange and distal thereto engages with a top of said railway frog first raised flange to thereby vertically locate said longitudinally extensive rail form relative to said railway frog first raised flange.

13. In combination, a self guarded railway frog and a self guarded railway frog weld fixture, said self guarded railway frog comprising
first and second raised flanges spaced apart from each other, said self guarded railway frog weld fixture comprising:
a longitudinally extensive rail form having
a longitudinal axis, and
a first longitudinally extensive and generally vertical side edge configured to abut with said self guarded railway frog first raised flange and define a proper repaired geometry for a first portion of said self guarded railway frog first raised flange, and further configured to separate from material additively welded to said first portion of said self guarded railway frog first raised flange when said rail form is abutted thereto;

a first transverse locator arm having a rail form coupling pintle about which said first transverse locator arm pivots relative to said rail form between a deployed position extending transversely from said rail form and a storage position extending longitudinally generally parallel to said rail form longitudinal axis;

said first transverse locator arm configured in said deployed position to engage with and apply a first force in a first direction to said railway frog second raised flange while simultaneously applying a second force to said rail form in a second direction opposed to said first direction;

a first lock configured to selectively lock said first transverse locator arm in at least said deployed position;

a second transverse locator arm having a rail form coupling pintle about which said second transverse locator arm pivots relative to said rail form between a deployed position extending transversely from said rail form and a storage position extending longitudinally generally parallel to said rail form longitudinal axis, said second transverse locator arm rail form coupling pintle spaced apart from said first transverse locator arm rail form coupling pintle;

said second transverse locator arm configured in said deployed position to engage with and apply a third force in a third direction to said railway frog second raised flange while simultaneously applying a fourth force to said rail form in a fourth direction opposed to said third direction; and a second lock configured to selectively lock said second transverse locator arm in at least said deployed position;

said first and second transverse locator arms each configured in said deployed position to independently span across and contact a top of said railway frog second raised flange and distal thereto a top of said railway frog first raised flange, to thereby vertically locate said longitudinally extensive rail form relative to said railway frog first raised flange;

whereby when said first and second transverse locator arms are in said deployed position, said rail form longitudinally extensive and generally vertical side edge abuts with and is in contact with a proper repaired geometry of said first portion of said self guarded railway frog first raised flange, and wear in said first portion of said self guarded railway frog first raised flange that deviates from said proper repaired geometry is defined by a repair weld gap between said rail form longitudinally extensive and generally vertical side edge and said self guarded railway frog first raised flange.

14. The combination self guarded railway frog and self guarded railway frog weld fixture of claim 13, wherein said longitudinally extensive rail form further comprises a second longitudinally extensive and generally vertical side edge displaced from said first longitudinally extensive and generally vertical side edge, said second longitudinally extensive and generally vertical side edge configured to abut with a second portion of said self guarded railway frog first raised flange and define a proper repaired geometry for said second portion of said self guarded railway frog first raised flange.

15. The combination self guarded railway frog and self guarded railway frog weld fixture of claim 14, wherein said proper repaired geometry for said first portion of said self guarded railway frog first raised flange and said proper repaired geometry for said second portion of said self guarded railway frog first raised flange are the same.

16. The combination self guarded railway frog and self guarded railway frog weld fixture of claim 14, wherein said proper repaired geometry for said first portion of said self guarded railway frog first raised flange and said proper repaired geometry for said second portion of said self guarded railway frog first raised flange are different.

17. The combination self guarded railway frog and self guarded railway frog weld fixture of claim 13, wherein said first lock is configured to selectively prevent rotation of said first transverse locator arm when said at least one transverse locator arm is in said deployed position, and is configured to selectively prevent rotation of said first transverse locator arm when said first transverse locator arm is in said storage position.

18. A method of repairing a self-guarded railway frog having first and second raised flanges spaced apart from each other, comprising the steps of:

spanning at least one locator arm from a top of said railway frog first raised flange to a top of said railway frog second raised flange;

suspending a rail form from said at least one locator arm in a location adjacent to and abutting with said railway frog first raised flange while said at least one locator arm spans from said top of said railway frog first raised flange to said top of said railway frog second raised flange;

applying a force through at least a part of said at least one spanning locator arm between and tending to spread said rail form away from said railway frog second raised flange;

pressing said rail form against said railway frog first raised flange responsive to said step of applying a force;

defining a damaged portion of said railway frog first raised flange by a gap between said rail form and said railway frog first raised flange responsive to said step of pressing said rail form against said railway frog first raised flange; and fusing a repair material to said damaged portion of said railway frog first raised flange within said gap.

19. The method of repairing a railway frog of claim 18, further comprising the steps of:

releasing said applied force between said rail form and said railway frog second raised flange subsequent to said fusing step; and pivoting said at least one locator arm from a first position longitudinally extending transverse to said rail form to a second position longitudinally extending generally parallel to said rail form subsequent to said releasing step.

20. The method of repairing a railway frog of claim 18, further comprising the steps of:

releasing said applied force between said rail form and said railway frog second raised flange subsequent to said fusing step;

pivoting said at least one locator arm from a first position longitudinally extending transverse to said rail form in a first direction to a second position longitudinally extending transverse to said rail form in a second direction opposite to said first direction subsequent to said releasing step; and repeating said steps of spanning, suspending, applying, pressing, defining, and fusing to a different portion of said self-guarded railway frog.

* * * * *